(12) United States Patent
Lenzini et al.

(10) Patent No.: US 7,626,955 B2
(45) Date of Patent: Dec. 1, 2009

(54) SYSTEM AND METHOD FOR PROVIDING A FAST AND OPTIMIZED UPLINK AND DOWNLINK SCHEDULING ALGORITHM FOR USE IN FDD COMMUNICATION SYSTEMS WITH HALF-DUPLEX STATIONS

(75) Inventors: Luciano Lenzini, Livorno (IT); Enzo Mingozzi, Pisa (IT); Andrea Bacioccola, Paciano (IT); Claudio Cicconetti, San Giuliano Terme (IT); Alessandro Erta, Barbarasco Tresana (IT)

(73) Assignee: Nokia Corporation, Espoo (FI)

( * ) Notice: Subject to any disclaimer, the term of this patent is extended or adjusted under 35 U.S.C. 154(b) by 656 days.

(21) Appl. No.: 11/119,550

(22) Filed: May 2, 2005

(65) Prior Publication Data

US 2006/0245380 A1    Nov. 2, 2006

(51) Int. Cl.
*H04L 5/16* (2006.01)
*H04J 3/00* (2006.01)
*H04J 1/00* (2006.01)
*H04L 12/43* (2006.01)
*H04M 3/42* (2006.01)

(52) U.S. Cl. .............. 370/296; 370/280; 370/281; 370/321; 370/337; 370/344; 370/347; 370/442; 370/458; 455/414.1

(58) Field of Classification Search ............ 370/276, 370/277, 281, 295
See application file for complete search history.

(56) References Cited

U.S. PATENT DOCUMENTS

| | | | | |
|---|---|---|---|---|
| 5,210,773 A | * | 5/1993 | Schmid et al. | 375/215 |
| 5,247,626 A | * | 9/1993 | Firoozmand | 709/212 |
| 6,301,244 B1 | * | 10/2001 | Huang et al. | 370/351 |
| 6,618,591 B1 | * | 9/2003 | Kalliokulju et al. | 455/452.2 |
| 2003/0018447 A1 | * | 1/2003 | Florschuetz | 702/124 |

FOREIGN PATENT DOCUMENTS

| | | |
|---|---|---|
| WO | WO 02/41520 | 5/2002 |
| WO | WO02/41520 | 5/2002 |
| WO | WO2004/004244 | 1/2004 |
| WO | WO 2004/004244 | 1/2004 |
| WO | WO2004/107605 | 12/2004 |

OTHER PUBLICATIONS

International Search Report.

* cited by examiner

*Primary Examiner*—Aung S Moe
*Assistant Examiner*—Hoon J Chung
(74) *Attorney, Agent, or Firm*—Banner & Witcoff, Ltd.

(57) ABSTRACT

A system and method for scheduling uplink and downlink burst data transmissions for half-duplex terminals in a communication system. After the first half duplex terminal capacity allocation is scheduled for a plurality of half duplex terminals, all available second half duplex terminals are placed in the same relative order as that of the half duplex terminal first capacity allocation. An iterative process is used in order to determine a final second frame layout. Once a set of potential solutions are determined, one solution is selected, and a final second frame structure is determined.

18 Claims, 4 Drawing Sheets

SYSTEM AND METHOD FOR PROVIDING A FAST AND OPTIMIZED UPLINK AND DOWNLINK SCHEDULING ALGORITHM FOR USE IN FDD COMMUNICATION SYSTEMS WITH HALF-DUPLEX STATIONS

FIELD OF THE INVENTION

The present invention relates generally to communication systems. More particularly, the present invention relates to communication systems where a bandwidth controller is needed in order to define the downlink and the uplink allocations.

BACKGROUND OF THE INVENTION

Communication systems having both uplink and downlink capabilities are typically characterized by a number of constraints. First, in such a communication system, uplink and downlink transmissions use different frequencies but are typically simultaneous. Downlink and uplink transmissions are also centrally scheduled frame-by-frame by a central controller, also referred to as an Access Point (AP). Such communication systems also provide support for half duplex terminals, and half duplex terminals are allowed to transmit before receiving and/or vice-versa. A half-duplex terminal is a terminal that alternates between sending and receiving information. An example of such a system is the air interface for the Institute of Electrical and Electronics Engineers (IEEE) 802.16 fixed broadband wireless access system.

When half duplex terminals are used in a particular communication system, the bandwidth controller does not allocate uplink bandwidth to a half-duplex terminal at the same time that it is expected to receive data on the downlink channel, including allowance for the propagation delay, the terminal transmit/receive transition gap and the terminal receive/transmit transition gap. On the other hand, the bandwidth controller may have to determine which packets should be the next to be transmitted, i.e. how to allocate bandwidth, in order to meet a variety of system-defined requirements. These requirements may include, for example, the provisioning of quality of service ("QoS") considerations.

SUMMARY OF THE INVENTION

The invention solves the problem of correctly allocating bandwidth in a communication system with half-duplex terminals. The present invention involves the use of an algorithm for scheduling uplink and downlink burst data transmissions for half-duplex terminals in a burst mode frequency division duplexing (FDD) system. The algorithm may be implemented in the devices which control the air interface. The algorithm assumes that data bursts to be transmitted in the frame are defined by a QoS scheduler according to a predetermined QoS model. The algorithm then finalizes the frame schedule by arranging the burst data transmission order in terms of both uplinking and downlinking, so that transmission and reception intervals (for each of the half-duplex terminals) do not overlap and the switching gaps constraints are satisfied.

The present invention provides a number of benefits not available under conventional systems. The algorithm of the present invention is optimal, in the sense that it is always successful, provided that the amount of capacity allocated in both uplinking and downlinking to half-duplex terminals does not exceed the frame length. Furthermore, the algorithm actually produces a set of valid solutions, among which it is possible to choose the solution that is optimal according to whatever optimum function is related to the communication system. The solutions presented by the present invention also are independent from any QoS scheduling design choice, and the set of feasible solutions permits to choose the best feasible solution among the others according to the optimum function related to the particular communication system. Furthermore, only a minimum level of achievable complexity is needed to solve the problems currently faced, and the solution is applicable in a wide variety of FDD networks.

With respect to prior attempted solutions to the problems discussed above, the present invention provides an increased number of potential solutions relative to prior innovations. Additionally, the present invention performs a fine grained computation; it exhibits a complexity of $O(n)$, while the prior algorithm exhibits a complexity of $O(n^2)$.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
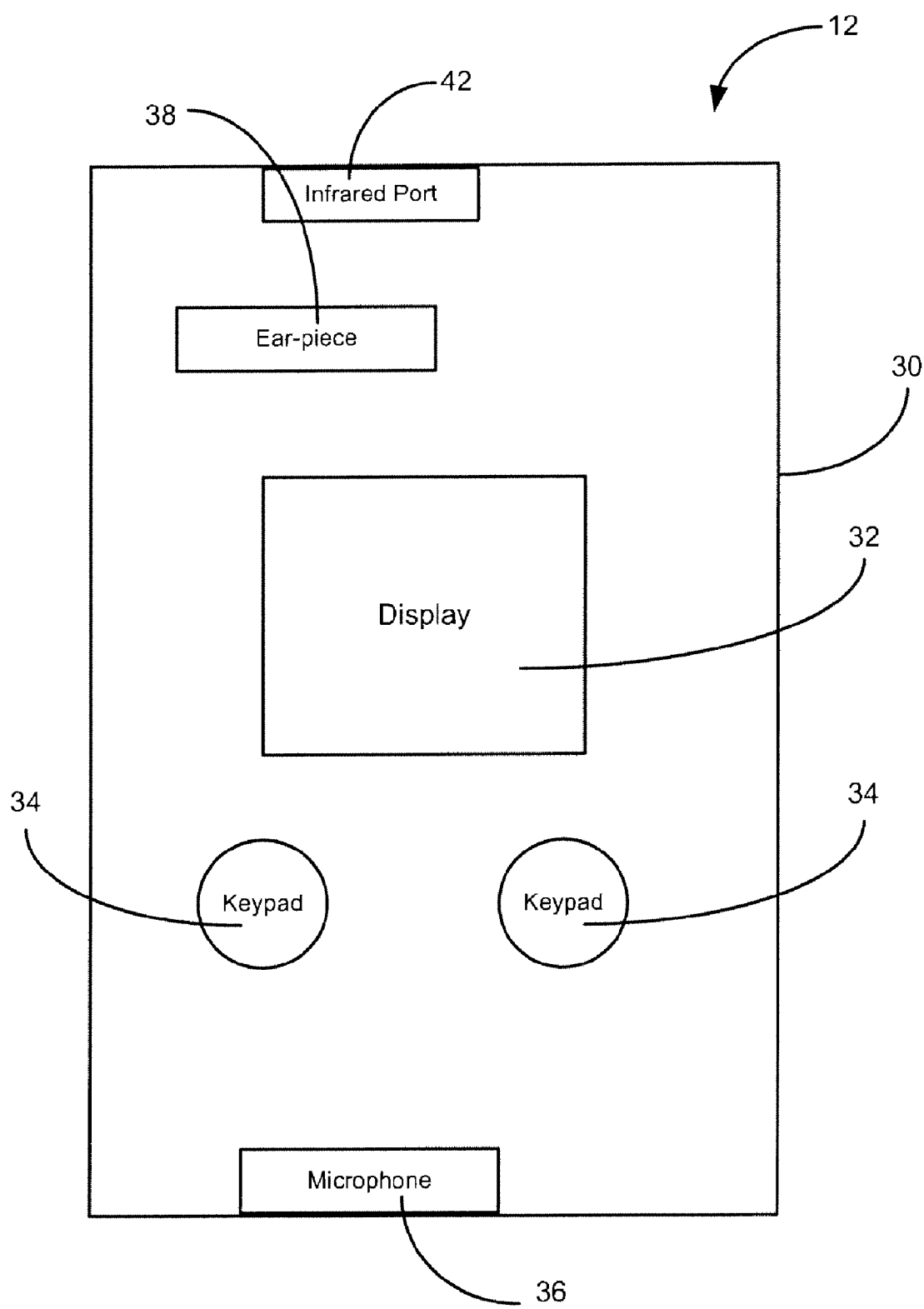
FIG. 1 is a perspective view of a mobile telephone that can be used in the implementation of the present invention.
Figure 2:
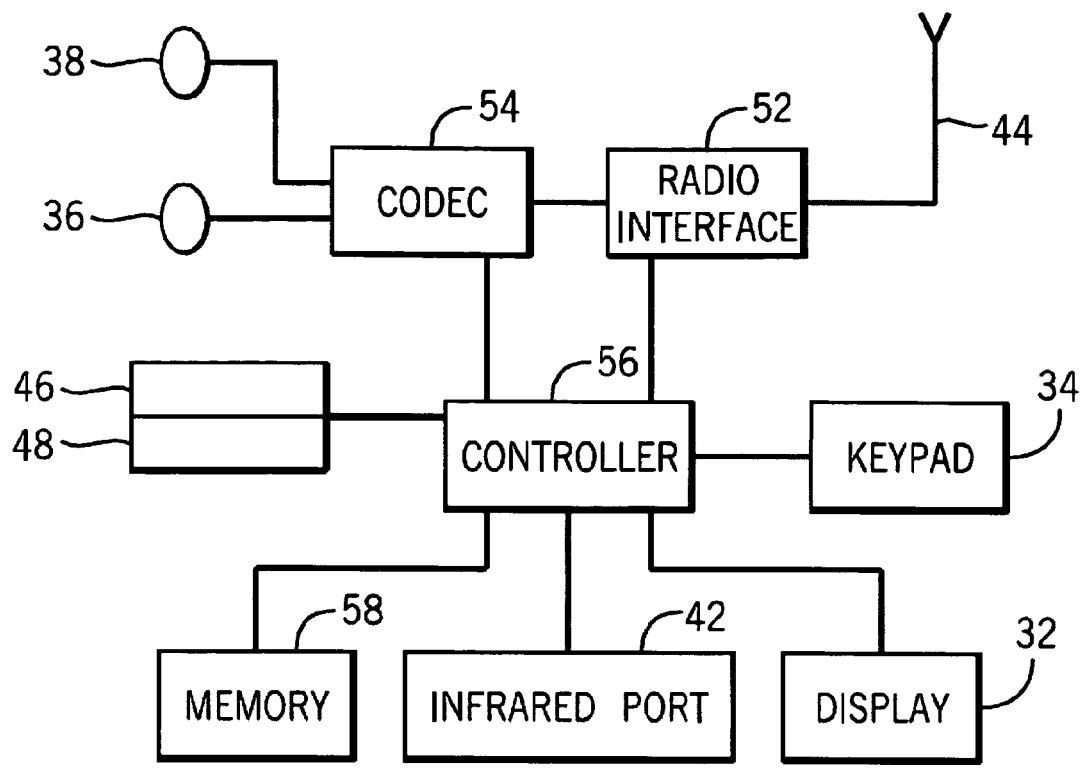
FIG. 2 is a schematic representation of the telephone circuitry of the mobile telephone of FIG. 1.

FIGS. 1 and 2 show one representative electronic device 12 within which the present invention may be implemented. It should be understood, however, that the present invention is not intended to be limited to one particular type of electronic device 12 or other electronic device. For example, the present invention can be incorporated into a combination personal digital assistant (PDA) and mobile telephone, a PDA, an integrated messaging device (IMD), a desktop computer, and a notebook computer. The present invention can be also incorporated into a combination of core network devices which have to control the air interface. The electronic device 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. Individual circuits and elements are all of a type well known in the art.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), asynchronous transfer mode (ATM), Short Messaging Service (SMS), Multimedia Messaging Service (MMS), e-mail, Instant Messaging Service (IMS), Bluetooth, IEEE 802.11, IEEE 802.16, etc.

As discussed above, the present invention involves the use of an algorithm for scheduling uplink and downlink burst data transmission for half-duplex terminals in a burst mode FDD system. The algorithm assumes that data bursts to be transmitted in the frame are defined by a QoS scheduler according to a predetermined QoS model. The algorithm then finalizes the frame schedule by arranging the burst data transmission order in both terms of both uplinking and downlinking, so that transmission and reception intervals (for each of the half-duplex terminals) do not overlap and the switching gap constraints are satisfied.

As an example, if the algorithm is used in a base station (BS) controlling orthogonal frequency division multiplexing (OFDM) FDD air interface as defined according to IEEE 802.16, the optimum function may be aimed at minimizing the number of uplink and downlink bursts transmitted in a frame, thus minimizing the number of entries in the downlink map, while allowing to schedule transmissions according to the respective QoS model.

In terms of the implementation of the present invention as discussed herein, the following notations are adopted:

n is the overall number of half duplex terminals being allocated capacity in a frame.

$u_i$ is the amount of uplink capacity, in time units, allocated for a terminal i.

$d_i$ is the amount of downlink capacity, in time units, allocated for the terminal i.

T is the total amount of capacity, in time units, available in the frame, both for uplink and downlink.

$s_i^u$ is the time offset, in time units, at which the uplink capacity allocation for the terminal i starts.

$s_i^d$ is the time offset, in time units, at which the downlink capacity allocation for the terminal i starts.

$f_i^u$ is the time offset, in time units, at which the uplink capacity allocation for the terminal i ends. It must be $f_i^u = |s_i^u + u_i|_T$, i.e., $s_i^u = |f_i^u - u_i|_T$.

$f_i^d$ is the time offset, in time units, at which the downlink capacity allocation for the terminal i ends. It must be $f_i^d = |s_i^d + d_i|_T$, i.e., $s_i^d = |f_i^d - d_i|_T$.

$(s_i^u, u_i)$ is the uplink capacity allocation for the terminal i.

$(s_i^d, d_i)$ is the downlink capacity allocation for the terminal i.

Figure 4:
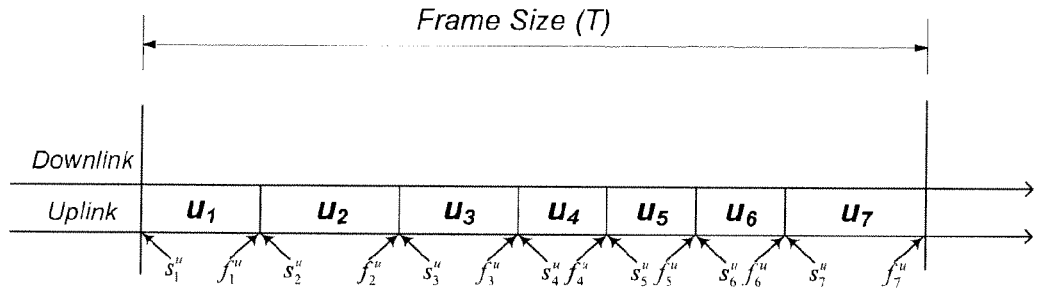
FIG. 4 is a representation of an uplink capacity allocation according to one embodiment of the present invention.

With respect to the above defined notations, the following assumptions are used before applying the algorithm:

1. A set $U = \{(s_i^u, u_i)\}$ of uplink capacity allocations is defined. The set is feasible, meaning that capacity allocations for different terminals do not overlap in time. It should be noted that any suitable scheduling algorithm, tailored to the system specific uplink QoS requirements, can be used to define the uplink capacity allocations. One representative situation is depicted in FIG. 4.

2. Access terminals are identified by an index number ranging from 1 to n, such that $i < j \Leftrightarrow s_i^u < s_j^u$, i.e., by increasing the uplink capacity allocation start time.

3. The amount of downlink capacity allocated for each terminal has been determined. In other words, the set of capacities $\{d_i\}$ is defined. Any suitable scheduling algorithm tailored to the system specific downlink QoS requirements can be used to define the downlink capacity allocations.

4. The set of capacities $\{d_i\}$ is such that $\Sigma d_i \leq T$, and $u_i + d_i \leq T$, $\forall i$.

Figure 3:
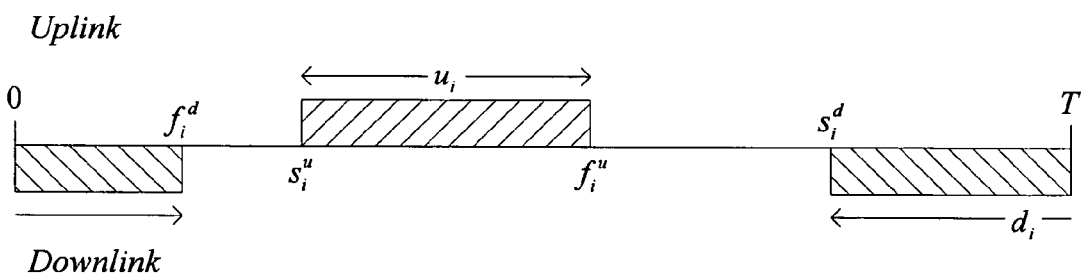
FIG. 3 is a representation of a generic uplink and downlink capacity allocation for a terminal i.

FIG. 3 represents a generic uplink capacity allocation. Each block represents the allocation of one terminal. The $s_i^u$ and the $f_i^u$ values are referred from the beginning of the frame. The greater the size of the block, the higher capacity is allocated to the terminal. In terms of the present invention, the goal is to find at least one set $D = \{(s_i^d, d_i)\}$ of feasible downlink capacity allocations.

Figure 5:
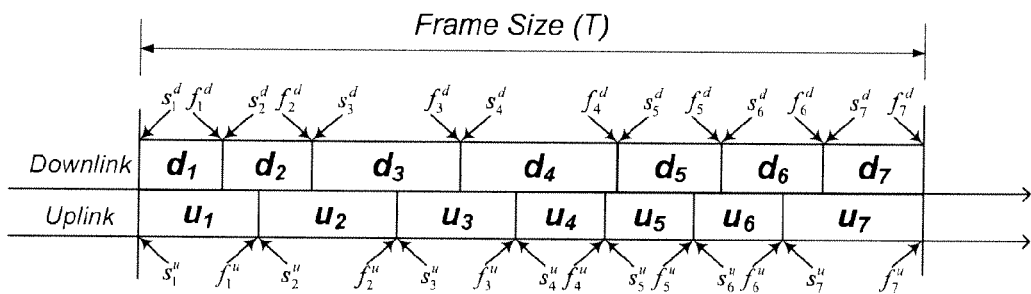
FIG. 5 is a representation of an unfeasible uplink and downlink capacity allocation order when the downlink allocations are placed in the same order as the respective uplink allocations.

The next step in the implementation of the algorithm of the present invention is to initially place all the downlink half duplex terminals in the same relative order as that of the uplink capacity allocation, independent of the way it was determined. The result of this step is depicted in FIG. 5. In general, the ordering may be determined depending on specific communication system constrains. As an example, in the standard IEEE 802.16 OFDM and SC FDD physical layers, a preferred choice is to order the uplink half duplex terminal capacity by decreasing robustness.

A solution to the allocation problem discussed herein is said to be "feasible" if and only if the blocks of the same terminals do not overlap, meaning that, in terms of FIG. 5, blocks of the terminal are not above each other. Therefore, the situation depicted in FIG. 5 is not a feasible solution to the allocation problem.

The next step involves the algorithm executing a sequence of n operations to determine the final downlink frame layout. Specifically, the algorithm finds a set X of suitable solutions to the allocation problem as follows:

$$\overline{X} \triangleq \left\{ x \in \mathbb{R} \;\middle|\; \max_i(f_i^d - s_i^u) \leq x \leq \min_i(s_i^d - f_i^u + T) \right\}$$

Figure 7:
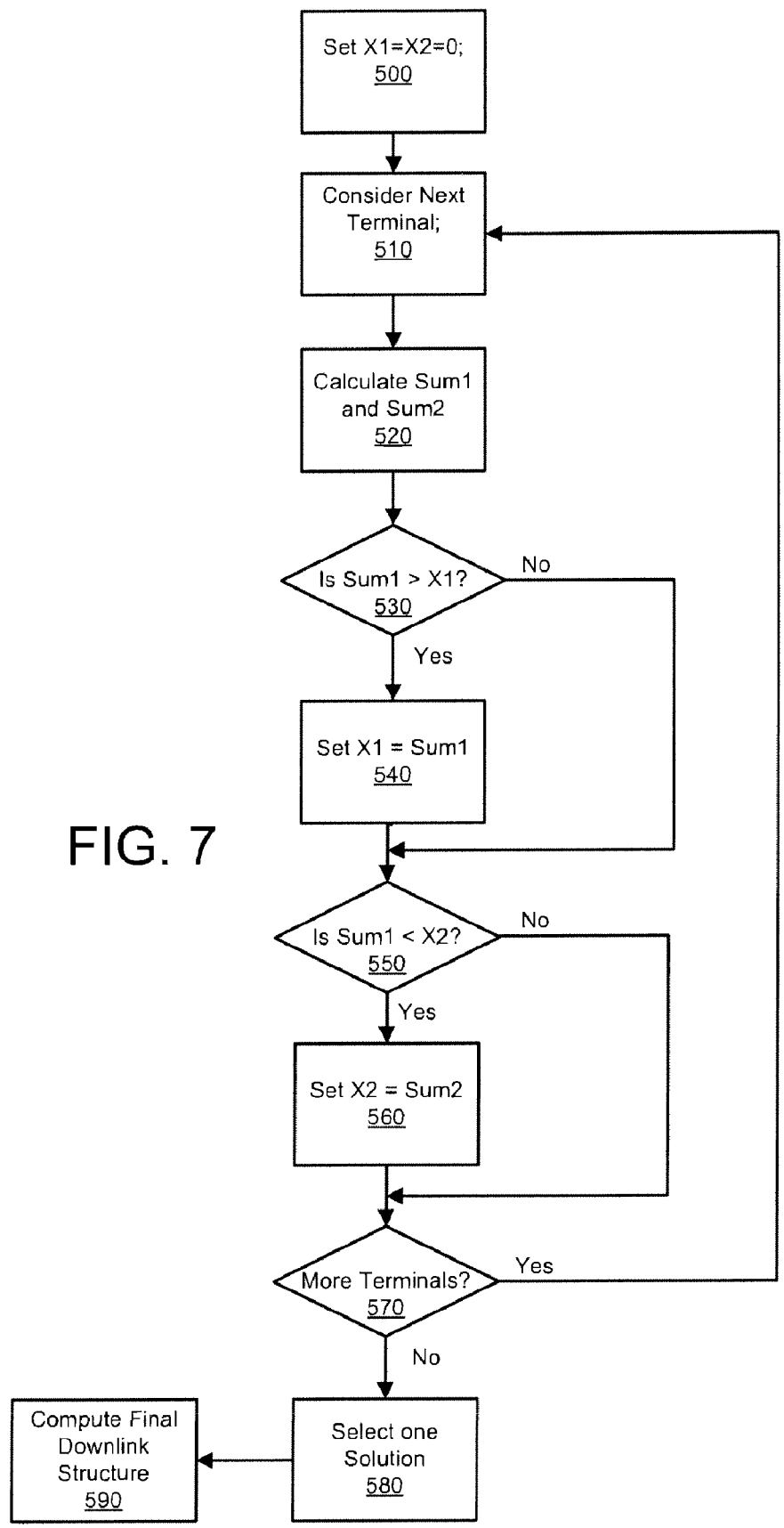
FIG. 7 is a flow chart depicting the steps involved in the implementation of one embodiment of the present invention.

The algorithm's operations can be detailed step-by-step according to the following sequence of steps. This sequence is depicted in FIG. 7. At step 500, the x1 and x2 variables are reset to zero, where x1 and x2 are two variables used to store the value of $$|x|_T = \begin{cases} x & 0 \leq x \leq T \\ T - x & -T < x < 0 \end{cases}.$$

respectively. The next terminal i is then considered at step 510. At step 520, the quantities sum1 and sum2 are calculated for the terminal i, where sum1 is defined as $f_i^d - s_i^u$ and sum2 is defined as $T + s_i^d - f_i^u$ for the terminal i under consideration. At step 530, the value of sum1 obtained in step 520 is compared to x1. If sum1 is greater than x1, then the sum1 value is assigned to x1 at step 540; otherwise, the system moves directly to step 550. At step 550, the value of sum2 obtained in step 520 is compared to x2. If sum2 is less than x2, then the sum2 value is assigned to x2 at step 560; otherwise, the system moves directly to step 570. At step 570, the system checks to determine whether there are half duplex terminals left to be processed. If so, then the system returns to step 510, and the next terminal is processed according to steps 520-560. At step 580, one solution x is selected from the set of solutions x according to the optimum function related to the communication system constraint. At step 590, the final downlink frame structure is computed according to the following: for each half duplex terminal, the final $s_i^d$ and $f_i^d$ is computed according to the formulas $s_i^d=|s_i^d-x|_T$ and $f_i^d=|f_i^d-x|_T$. It should be noted that the actions discussed herein can also be reversed with respect to the uplink and downlink functions.

The formulas $s_i^d=|s_i^d-x|_T$ and $f_i^d=|f_i^d-x|_T$ are used to determine the final downlink allocation as shown. The mathematical modulus operation is defined as $$\max_i(f_i^d - s_i^u) \text{ and } \min_i(s_i^d - f_i^u + T),$$

The x value is defined as $-T<x<T$. The modulus operation is the mathematical formula to represent the idea of the shift in a circular way. Because the result of the formulas could be less than zero, the modulo operation $|\ |_T$ is used. A negative result of the formula means that the computed value has to be referred to the end of the frame (i.e. the shift of the block continues from the end of the frame).

Figure 6:
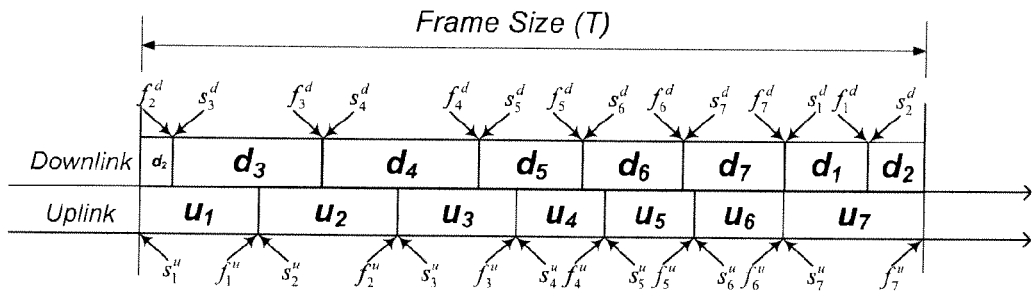
FIG. 6 is a representation of a feasible uplink and downlink capacity allocation order according to the principles of the present invention.

The resulting allocation is depicted in FIG. 6. This allocation is obtained using the formula x=x1. In this allocation, there are no overlapping blocks, and the allocation is feasible.

The rationale behind the algorithm described above is to formalize the process of disposing uplink bursts, disposing downlink bursts, and moving the downlink bursts to the left (according to FIGS. 5 and 6) in a circular way, after a feasible allocation is found. By a "circular way," it is mean that each downlink burst is moved to the left, and when a block reaches the frame start while shifting to the left, it continues shifting but from the end of the frame. For example, in the allocation process depicted in FIGS. 4-6, $_{d1}$ and d$_2$ reaches the frame starting point and therefore continued shifting from the end of the frame. The x value computed by the algorithm represents the length of the respective shift.

The following is a generic code implementation for the present invention:

1. x1=0
2. x2=0
3. sum1=0;
4. sum2=0;
5. for (i=1; i<=n; i++) {
6. sum1=f_d[i]–s_u[i];
7. if (sum1>=x1)x1=sum1;
8. sum2=s_d[i]–f_u[i]+T;
9. if (sum2<=x2)x2=sum2;
10.}
11. x=select(x1, x2);
12. for (i=1; i<=n; i++) {
13. s_d[i]=mod(s_d[i], T);
14. f_d[i]=mod (f_d[i], T);
15.}

An alternative implementation of the algorithm is shown below. It should be noted that the code below reports only a procedure for finding the set of suitable solutions X omitting the allocation part which remains the same among implementations.

1. x1=0, x2=0;
2. sum1 =0, sum2=0;
3. for (i=1; i<=n; i++) {
4. sum1+=d[i]–s_u[i]+s_u[i–1];
5. sum2+=d[i–1]–f_u[i]+f_[i–1]+T;
6. if (sum1>=x1)x1=sum1;
7. if (sum2>=x2)x2=sum2;
8.}
9. return (x1, x2)

According to the IEEE 802.16 standard with both OFDM or SC FDD physical layers, the optimal choice that is computed is such that x is equal to x1. This choice, and the decreasing robustness ordering of half duplex terminals, permits one to achieve the goal of minimizing the numbers of preambles and the number of map entries, reducing the system's overhead and thus maximizing the channel utilization.

A generic code implementation is represented below for the cases of the standard IEEE 802.16 with OFDM and SC FDD physical layers, omitting the allocation portion. The code is more simplified than that discussed above due to the choice associated to the optimum function. In fact, in this case it is necessary to compute only x1 because the chosen value x is simply x1.

1. x=0;
2. sum=0;
3. for (i=1; i<=n; i++) {
4. sum+=d[i]–s[i]+s[i–1];
5. if (sum>=x) x=sum;
6.}
7. return x;

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, are intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
    ordering, at a network device, a plurality of first capacity allocations within a transmission frame, wherein each of the plurality of first capacity allocations correspond to one of a plurality of half duplex terminals, the plurality of first capacity allocations being a selected one of an uplink capacity allocation and a downlink capacity allocation in accordance with a ordering rule, wherein each of the plurality of first capacity allocations have a start time and an end time;
    ordering, at the network device, a plurality of second capacity allocations within the transmission frame, wherein each of the plurality of second capacity allocations correspond to one of the plurality of half duplex terminals, the plurality of second capacity allocations being the unselected one of the uplink capacity allocation and the downlink capacity allocation in accordance with the same ordering rule of the first capacity allocations, wherein each of the plurality of second capacity allocations have a start time and an end time;

iteratively determining, at the network device, for each of the plurality of half duplex terminals:
  a first time interval representing a difference between a second capacity allocation end time of a terminal and a first capacity allocation start time of the terminal, and
  a second time interval representing a total capacity of the transmission frame plus a second allocation start time of the terminal minus a first allocation end time of the terminal;

forming, at the network device, a set of solutions by:
  determining a maximum first time interval among the first time intervals of all of the terminals,
  determining a minimum second time interval among the second time intervals of all of the terminals, and
  defining the set of solutions as all values between the maximum first time interval and the minimum second time interval;

selecting, at the network device, a capacity allocation solution value from the set of solutions using an optimum function related to a communication system used and calculating a shift length for each of the plurality of second capacity allocations based on the value selected; and reordering, at the network device, the plurality of second capacity allocations according to the shift length.

2. The method of claim 1, wherein the communication system comprises a burst mode FDD system.

3. The method of claim 1, wherein the first capacity allocations are ordered by decreasing robustness.

4. The method of claim 1, wherein one value from the set of solutions is selected according to the optimum function related to a communication system constraint.

5. The method of claim 1, wherein formulas $s_i^d = |s_i^d - x|_T$ and $f_i^d = |f_{id} - x|_T$ are used to determine the shift length for one of the half duplex terminal i, and wherein $s_i^d$ is a time offset, in time units, at which the second capacity allocation for the terminal i starts; $f_i^d$ is a time offset, in time units, at which the second capacity allocation for the terminal i ends; T is a total amount of capacity, in time units, available in the transmission frame, both for the uplink and the downlink transmission; the operator $| \ldots |_T$ denotes a modulus operation with respect to the total amount of capacity, T; and x represents the selected capacity allocation solution value.

6. The method of claim 1, wherein data bursts are transmitted or received by the one of the plurality of half duplex terminals during each of the first and second capacity allocations within the transmission frame, the data bursts being defined by a QoS scheduler according to a predetermined model.

7. A memory storage device having computer executable instructions that when executed by a processor perform:
  ordering a plurality of first capacity allocations within a transmission frame, wherein each of the plurality of first capacity allocations correspond to one of a plurality of half duplex terminals, the plurality of first capacity allocations being a selected one of an uplink capacity allocation and a downlink capacity allocation in accordance with a ordering rule, wherein each of the plurality of first capacity allocations have a start time and an end time;

ordering a plurality of second capacity allocations within the transmission frame, wherein each of the plurality of second capacity allocations correspond to one of the plurality of half duplex terminals, the plurality of second capacity allocation being the unselected one of the uplink capacity allocation and the downlink capacity allocation in accordance with the same ordering rule of the first capacity allocations, wherein each of the plurality of second capacity allocations have a start time and an end time;

determining for each of the plurality of half duplex terminals iteratively:
    a first time interval representing the difference between a second capacity allocation end time of a terminal and a first capacity allocation start time of the terminal,
    a second time interval representing a total capacity in the transmission frame plus a second allocation start time of the terminal minus a first allocation end time of the terminal;

forming a set of solutions to by:
    determining a maximum first time interval among the first time intervals of all of the terminals,
    determining a minimum second time interval among the second time intervals of all of the terminals, and
    defining the set of solutions as all values between the maximum first time interval and the minimum second time intervals;

selecting a capacity allocation solution value from the set of solutions using an optimum function related to a communication system used and calculating a shift length for each of the plurality of second capacity allocations based on the value selected; and reordering the plurality of second capacity allocations according to the shift length.

8. The memory storage device of claim 7, wherein the communication system comprises a burst mode FDD system.

9. The memory storage device of claim 7, wherein the first capacity allocation are ordered by decreasing robustness.

10. The memory storage device of claim 7, wherein one value from the set of solutions is selected according to the optimum function related to a communication system constraint.

11. The memory storage device of claim 7, wherein formulas $s_i^d = |s_i^d - x|_T$ and $f_i^d = |f_i^d - x|_T$ are used to determine shift length for one of the half duplex terminal i, and wherein $S_i^d$ is a time offset, in time units, at which the second capacity allocation for the terminal i starts; $f_i^d$ is a time offset, in time units, at which the second capacity allocation for the terminal i ends; T is a total amount of capacity, in time units, available in the transmission frame, both for the uplink and the downlink transmission; the operator $| \ldots |_T$ denotes a modulus operation with respect to the total amount of capacity, T; and x represents the selected capacity allocation solution value.

12. The memory storage device of claim 7, wherein data bursts are transmitted or received by the one of the plurality of half duplex terminals during each of the first and second capacity allocations within the transmission frame, the data bursts being defined by a QoS scheduler according to a predetermined model.

13. An apparatus comprising:
  a processor;
  a memory storing instructions that when executed, cause the apparatus to:
    order a plurality of first capacity allocations within a transmission frame, wherein each of the plurality of first capacity allocations correspond to one of a plurality of half duplex terminals, the plurality of first capacity allocations being selected one of an uplink capacity allocation and a downlink capacity allocation in accordance with a ordering rule, wherein each of the plurality of first capacity allocations having a start time and an end time;

order a plurality of second capacity allocations within the transmission frame, wherein each of the plurality of second capacity allocations correspond to one of the plurality of half duplex terminals, the plurality of second capacity allocations being the unselected one of the uplink capacity allocation and the downlink capacity allocation in accordance with the same ordering rule of first capacity allocations, wherein each of the plurality of second capacity allocations have a start time and an end time;

determine for each of the plurality of half duplex terminals iteratively:
  a first time interval representing a difference between a second capacity allocation end time of a terminal and a first capacity allocation start time of the terminal, and
  a second time interval representing a total capacity of the transmission frame plus a second allocation start time of the terminal minus a first allocation end time of the terminal;

form a set of solutions to by:
  determining the maximum first time interval among the first time intervals of all of the terminals,
  determining the minimum second time interval among the second time intervals of all of the terminals, and
  defining the set of solutions as all values between the maximum first time interval and the minimum second time interval;

select a capacity allocation solution value from the set of solutions using an optimum function related to a communication system used and calculate a shift length for each of the plurality of second capacity allocations based on the value selected; and reorder the plurality of second capacity allocations according to the shift length.

14. The apparatus of claim 13, wherein the communication system comprises a burst mode FDD system.

15. The apparatus of claim 13, wherein the first capacity allocations are ordered by decreasing robustness.

16. The apparatus of claim 13, wherein one value from the set of solutions is selected according to the optimum function related to a communication system constraint.

17. The apparatus of claim 13, wherein formulas $s_i^d = |s_i^d - s|_T$ and $f_i^d = |f_i^d - x|_T$ are used to determine the shift length for one of the half duplex terminal i, and wherein $s_i^d$ is a time offset, in time units, at which the second capacity allocation for the terminal i starts; $f_i^d$ is a time offset, in time units, at which the second capacity allocation for the terminal i ends; T is a total amount of capacity, in time units, available in the transmission frame, both for the uplink and the downlink transmission; the operator $|\ldots|_T$ denotes a modulus operation with respect to the total amount of capacity, T; and x represents the selected capacity allocation solution value.

18. The apparatus of claim 13, wherein data bursts are transmitted or received by the one of the plurality of half duplex terminals during each of the first and second capacity allocations within the transmission frame, the data bursts being defined by a QoS scheduler according to a predetermined model.

* * * * *